(12) United States Patent
Warren et al.

(10) Patent No.: US 9,720,895 B1
(45) Date of Patent: Aug. 1, 2017

(54) DEVICE FOR CONSTRUCTION OF COMPUTABLE LINKED SEMANTIC ANNOTATIONS

(71) Applicants: Mary Margaret Warren, Gulf Breeze, FL (US); Patrick John Hayes, Pensacola, FL (US); Thomas Charles Eskridge, Gulf Breeze, FL (US); James Lott, Pensacola, FL (US); Michael Brunnbauer, Neuried (DE)

(72) Inventors: Mary Margaret Warren, Gulf Breeze, FL (US); Patrick John Hayes, Pensacola, FL (US); Thomas Charles Eskridge, Gulf Breeze, FL (US); James Lott, Pensacola, FL (US); Michael Brunnbauer, Neuried (DE)

(73) Assignee: Metadata Authoring Technologies, LLC, Gulf Breeze, FL (US)

( * ) Notice: Subject to any disclaimer, the term of this patent is extended or adjusted under 35 U.S.C. 154(b) by 284 days.

(21) Appl. No.: 14/300,952

(22) Filed: Jun. 10, 2014

Related U.S. Application Data (63) Continuation-in-part of application No. 14/140,869, filed on Dec. 26, 2013, now abandoned.

(60) Provisional application No. 61/833,209, filed on Jun. 10, 2013, provisional application No. 61/746,031, filed on Dec. 26, 2012.

(51) Int. Cl.
*G06F 17/00* (2006.01)
*G06F 17/24* (2006.01)
*G06F 17/30* (2006.01)

(52) U.S. Cl.
CPC ...... *G06F 17/241* (2013.01); *G06F 17/30882* (2013.01)

(58) Field of Classification Search
CPC ...................................................... G06F 17/241
See application file for complete search history.

(56) References Cited

U.S. PATENT DOCUMENTS

| | | | |
|---|---|---|---|
| 7,068,309 B2 | 6/2006 | Toyama et al. | |
| 7,243,301 B2 | 7/2007 | Bargeron et al. | |
| 7,788,575 B2 | 8/2010 | Carlson et al. | |
| 8,069,194 B1 * | 11/2011 | Manber | G06F 17/30011 707/959 |
| 8,099,662 B2 | 1/2012 | Ivashin et al. | |
| 8,140,973 B2 | 3/2012 | Sandquist et al. | |
| 8,271,542 B1 | 9/2012 | London | |
| 8,572,086 B2 * | 10/2013 | Soderberg | G06F 17/30265 382/180 |

(Continued)

*Primary Examiner* — Stephen Hong
*Assistant Examiner* — Gregory Vaughn
(74) *Attorney, Agent, or Firm* — Garvey, Smith & Nehrbass, Patent Attorneys, L.L.C.; Mackenzie D. Rodriguez; Seth M. Nehrbass (57) ABSTRACT

A system that improves the current state of the art with a device for users to annotate information system resources with semantically rich data and that same data is then immediately transformed into structured machine-readable content that is portable and re-usable through linked data methods. The techniques used in the invention can be used over many combinations of information systems and resources, including the internet, in a stand-alone configuration, or in an intranet or enterprise system; for resources including images, documents, music files, videos, or any other resources that exist in a digital domain.

11 Claims, 8 Drawing Sheets flow chart for the present invention (56) References Cited

U.S. PATENT DOCUMENTS

| | | | |
|---|---|---|---|
| 8,645,991 B2* | 2/2014 | McIntire | H04N 7/17318 725/34 |
| 2007/0250901 A1* | 10/2007 | McIntire | H04N 7/17318 725/146 |
| 2012/0023103 A1* | 1/2012 | Soderberg | G06F 17/30265 707/739 |
| 2012/0300089 A1* | 11/2012 | Sbaiz | H04N 1/00323 348/222.1 |
| 2013/0091161 A1* | 4/2013 | McCarley | G06Q 10/06395 707/769 |
| 2013/0129252 A1* | 5/2013 | Lauper | G06F 17/30041 382/276 |
| 2013/0254126 A1* | 9/2013 | Koenig | G06Q 10/00 705/311 |
| 2014/0032616 A1* | 1/2014 | Nack | G06F 17/241 707/805 |
| 2014/0108424 A1* | 4/2014 | Casella Dos Santos | G06F 17/30604 707/748 |
| 2015/0152423 A1 | 6/2015 | Thorsness et al. | |

\* cited by examiner keywords: place setting, fork, spoon, knife, coffee cup, iced tea, napkin, formal dinner, Atlanta Foundry, formal setting (12)

Figure 5 structure of an RDF triple

Figure 6 an example of a type of triple created by our device

Figure 7 combining triples creates an RDF graph

```
<img src="http://www.imagesnippets.com:8080/imgtag/images/demo@zeroexp.com/formalsetting2.JPG'
    typeof='iio:Image' />

<div style="display:none">
<svg width="334" height="252"><defs/><rect x="287" y="199" height="144" width="99" id="#Region_Region%20A"/><rect x="326"                                (94)
y="104" height="81" width="96" id="#Region_Region%20B"/></svg>
<span about="http://www.imagesnippets.com:8080/imgtag/images/mm@zeroexp.com/formalsetting2.JPG"><span
rel="iio:hasVisualPart"><span resource="#Region_Region%20A">#Region_Region%20A</span></span>                                                               (96)
<span about="http://www.imagesnippets.com:8080/imgtag/images/mm@zeroexp.com/formalsetting2.JPG"><span
rel="iio:hasVisualPart"><span resource="#Region_Region%20B">#Region_Region%20B</span></span></span>
<span about="#Region_Region%20A"><span rel="iio:shows">
<span typeof="dbpedia:Fork">a fork</span></span>                                                                                                          (98)
<span about="http://www.imagesnippets.com:8080/imgtag/images/mm@zeroexp.com/formalsetting2.JPG"><span
rel="iio:depicts"><span resource="[yago:wordnet_place_setting_103953743]">place setting</span></span>                                                     (100)
<span about="#Region_Region%20B"><span rel="iio:shows"><span resource="[dbpedia:Coffee_cup]">coffee                                                        (102)
cup</span></span></span>
<span about="http://www.imagesnippets.com:8080/imgtag/images/mm@zeroexp.com/formalsetting2.JPG"><span
rel="dc:rights"><span property="iio:label" content="© 1980-2003 Margaret Warren"></span></span>                                                           (104)
</div>
```

Figure 9 RDFa information stored in an html file

DEVICE FOR CONSTRUCTION OF COMPUTABLE LINKED SEMANTIC ANNOTATIONS

CROSS-REFERENCE TO RELATED APPLICATIONS

This is a continuation-in-part of U.S. patent application Ser. No. 14/140,869, filed Dec. 26, 2013, which claims the benefit of U.S. Provisional patent application Ser. No. 61/746,031, filed Dec. 26, 2012, both of which are incorporated herein by reference.

This application claims the benefit of U.S. Provisional patent application Ser. No. 61/833,209, filed Jun. 10, 2013, which is also incorporated herein by reference. Priority of U.S. Provisional patent application Ser. No. 61/833,209, filed Jun. 10, 2013, and U.S. Provisional patent application Ser. No. 61/746,031, filed Dec. 26, 2012, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention The present invention relates to a device for the construction of computable linked semantic annotations. More particularly, the present invention relates to a device which can be used by human agents to selectively interpret and apply semantically-complex linked-metadata annotations to information system resources which are immediately transformed by the device into structured, machine computable, re-usable and portable content.

2. General Background of the Invention There is a well-known proliferation of computing devices accessing and adding content exponentially (in the form of images, music, videos, articles, etc.) to the inter-connected information system of data accessed via internet technologies. Information system resource descriptions and annotations provide the basis for several currently utilized search strategies. Many methods exist today for content to be annotated in the form of keywords (also known as tags) or with automatically created and applied data from the computing devices themselves (e.g., GPS coordinates in photographs). However, there are recognizable deficiencies in many of these methods. Keywords are often ambiguous and they do not contain information about the context: the way the keyword relates to the resource itself. Automated methods of constructing the correct meaning and relationships from existing metadata often lack the accuracy and discernment that can be gained from human judgment. Metadata is often separate from the resource itself. Hypertext linked pages contain content that may be associated with images by proximity, but there is no guarantee the content actually describes the image. Computing machinery and software often strip images of their metadata content, either inadvertently or to save space or to deliberately defeat copyright law.

The following U.S. patents and websites are incorporated herein by reference: U.S. Pat. No. 7,068,309 entitled "Image exchange with image annotation"; U.S. Pat. No. 8,271,542 entitled "Metadata Producer"; U.S. Pat. No. 7,243,301 entitled "Common Annotation Framework"; U.S. Pat. No. 7,788,575 entitled "Automated Image Annotation"; U.S. Pat. No. 8,099,662 entitled "Efficient image annotation display and transmission"; U.S. Pat. No. 8,140,973 entitled "Annotating and sharing content"; and, www.imagesnippets.com.

BRIEF SUMMARY OF THE INVENTION

The inventors have created a system that improves the current state of the art with a device for users to annotate information system resources with semantically rich data and that same data is then immediately transformed into structured machine-readable content that is portable and re-usable through linked data methods.

The techniques used in the invention can be used over many combinations of information systems and resources. For example, the interface can be used over the internet, also known as the web, or it can be used in a stand-alone configuration, or it can be used in an intranet or enterprise system. The resources described can be images, but also documents, music files, videos, or any other resources that exist in a digital domain. The embodiment of the interface we present for this document uses images as the resources with those images being stored on a web hosted server. In this embodiment, the invention:

1. Uses a conventional computing structure and provides methods for human agents to accumulate and annotate their own images or freely-available (not subject to copyright) images represented in a digital format.

2. Presents human agents with an interface for creating, editing, and saving semantically rich annotations through the use of a humanly readable interface and makes the annotations transportable and re-usable throughout larger information systems.

3. Allows the human agents to query and use distributed taxonomies to locate terms for use in the annotations or create new taxonomies capable of being integrated into distributed information systems.

4. Links the images into distributed resource description frameworks.

Our system takes the current practices of people applying keywords to any kind of digital resource (images, documents, video, music, etc.) and combines it with a way for the user to choose an object term, combined with a relationship term which is humanly readable, and then saves that 'triple-tag' or 'triple-keyword' as a piece of data understood and read by a computer that can be used for queries, computations or other manipulations that machines can make. Depending on the resource and the subject of the triples, the relationship term will generally be provided as a pre-selected list of possible terms that will guide the user to build triples that are more satisfying to a machine.

A key aspect of an embodiment of the present invention is that we are making a 'triple-tag' or 'triple-keyword' system that can be used to tag or mark up any resource. These 'triple-tags' or 'triple-keywords' are mostly humanly understandable and read like a sentence, but the computer saves them as syntactically correct machine language, which may be RDF (Resource Description Framework), other RDF variety (such as RDFa, N3, Turtle, etc.), or a variant of a machine readable language that works in a stand-alone system or across systems that uses, reads, stores, and/or queries these languages.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The goal of our invention is to create semantically rich computable annotations that can be used in a stand-alone information system or in a distributed computer networked system. The semantically rich annotations allow for uses such as search, categorization, and clustering.

Annotations are also referred to as metadata, which means: data about data. Metadata can be described as being unstructured or structured. Unstructured metadata usually refers to information used in a computing system that does not follow a data model or contain an underlying structure that can easily be used in a computer or machine-computing environment. An information system requires many additional instructions and inferences to produce desired output from an accumulation of unstructured metadata. In contrast, structured metadata, because it is computable and follows a well specified format; improves computational efficacy, reduces overall computing costs, improves the accuracy of queries and extends the programmatic possibilities for the re-use of the data.

Figure 1:
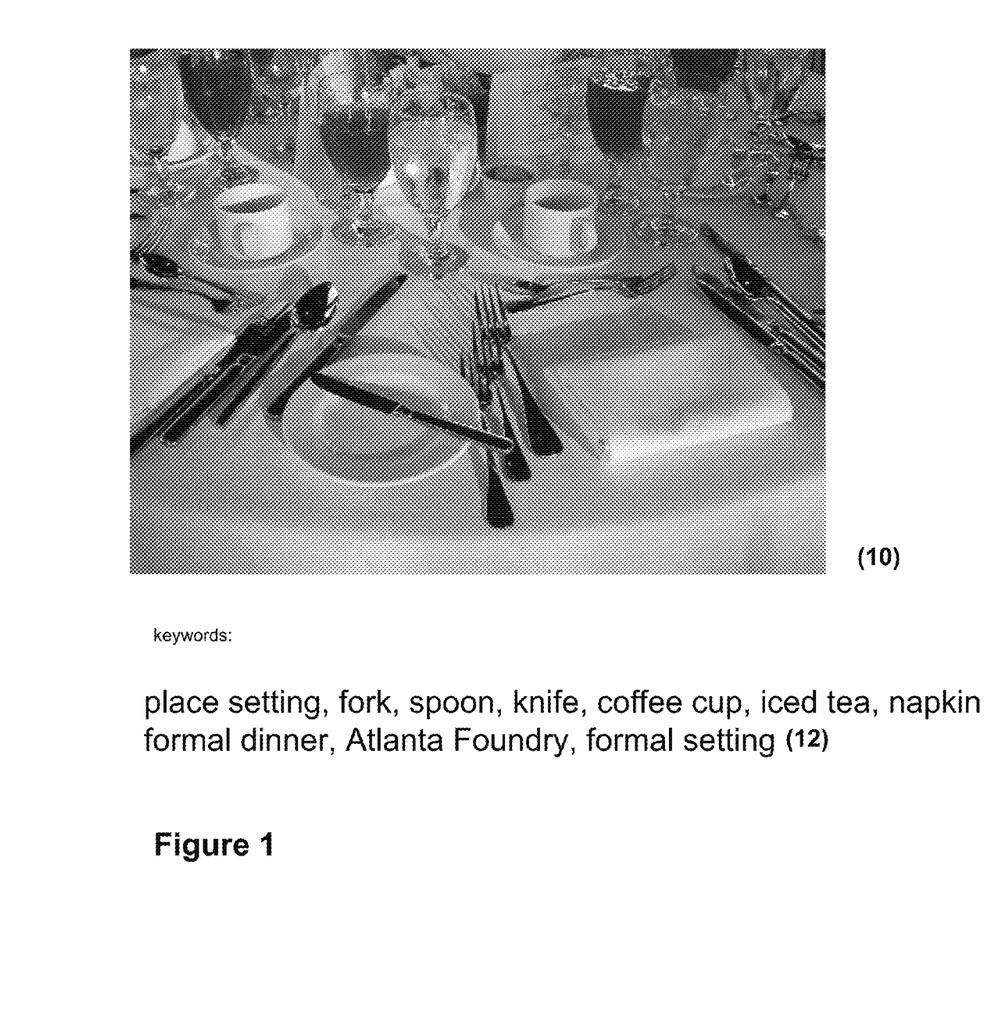
FIG. 1 illustrates an image resource with accompanying keywords also known as tags typically used as annotations and referred to as metadata in the current state of the art.

Human users easily create complex, semantically rich descriptions of many different types of computing resources, of which images are one example, but these descriptions are usually considered unstructured to a machine. Keywords typically used to describe images are structured only in the sense that the machine recognizes them in their lexical format and in the function of being keywords. However, the machine will not know whether the word 'fork' refers to a place where a road diverges, or to a piece of cutlery used for eating. Further, the machine does not know whether the fork is being used to eat with or is being used in a place setting. FIG. 1 illustrates an image 10 with accompanying metadata in the form of keywords 12. The image resource could also be any kind of information resource used in a computing environment, i.e. a hypertext document, a music file, a video file, etc. In the remainder of this example we continue to describe the structure and effectiveness of the present invention using images.

Information systems ultimately create usefulness for the human who use them, but data, particularly in a distributed network is itself consumed not only by humans but also by computing machines that can perform calculations and actions on this data. Human agents, i.e. intelligent agents, are therefore not only the consumers of their metadata, but also the creators of metadata consumed by both humans and machines. Our invention uses an interface on a computing device through which the human users, acting as agents, can manually create high-quality, semantically complex structured content which can then be made immediately available for machine reuse and consumption. The machine-readable annotations are saved in a resource description framework format. The resource description format further allows the images to be linked across distributed systems. Other embodiments of our invention would include a similar interface to annotate text, hypertext, music, video files or other resources that can be interpreted by a machine computable information system.

Figure 2:
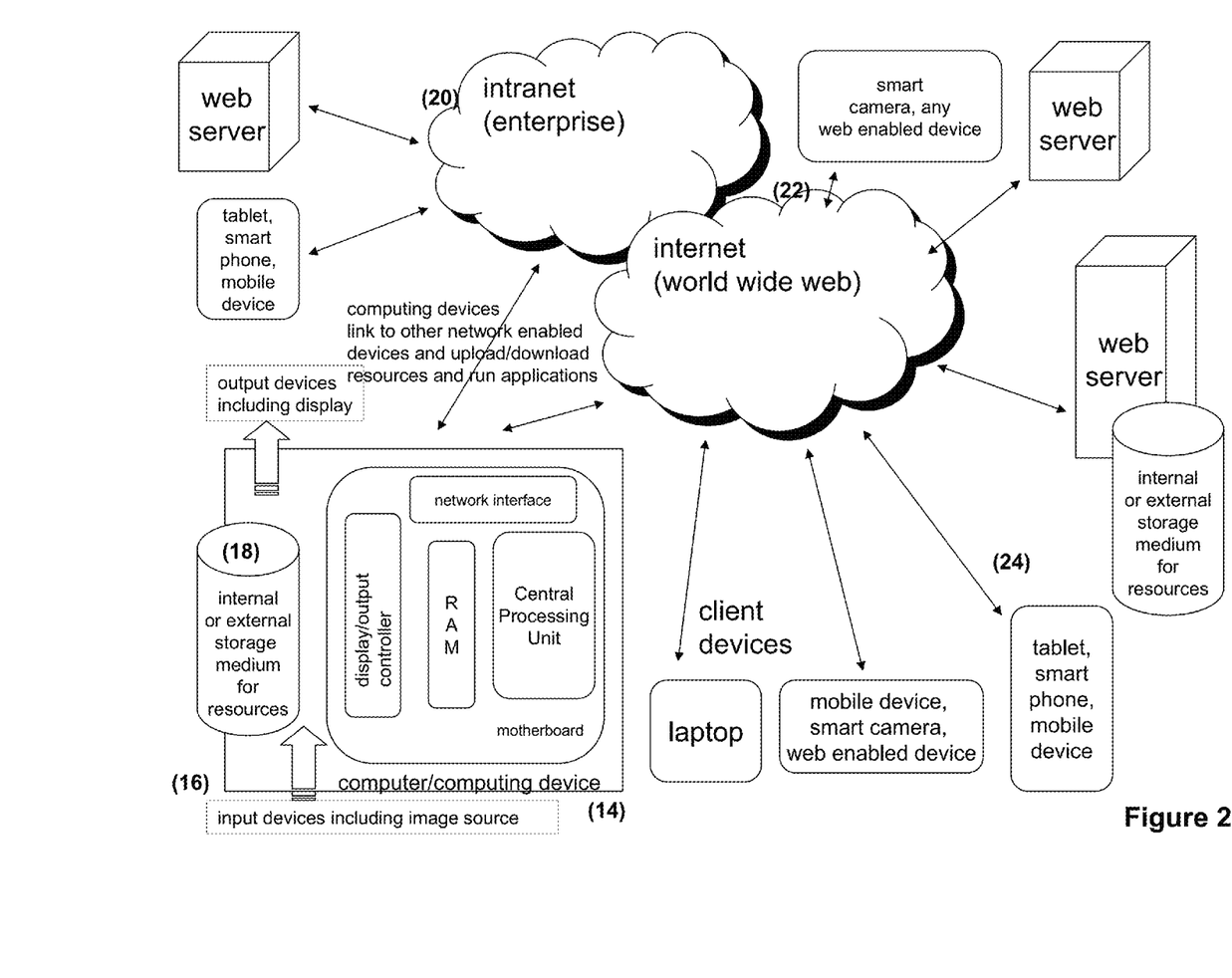
FIG. 2 is a block diagram of a computing machine and several types of information systems.

Practitioners of the art understand that computing systems consist of central processing units that interpret programmed instructions on data that is input into the system. Networks and larger information systems combine sets of instructions across multiple processing units and require common formats for the interchange of data. FIG. 2 illustrates a computing machine and several types of information systems. A computing machine contains a central processing unit (14), input devices (16) and local storage devices (18). In a distributed information environment, computing devices using common protocols can interchange data across networks. Networks can operate in a closed environment, open only to permitted devices and users called an intranet (20). Intranets are commonly used in large organizations or enterprises. A network that operates across the globe and is open to all users is also known as 'the internet' or the 'world wide web' (22).

Computing devices including mobile devices, smart phones, tablets, laptops, wireless printers, cameras and any other computing device capable of sending and receiving network signals (through wired or wireless means) connect to web servers through the internet (24). Computing machines can run web server software and emulate a networked environment as stand-alone systems. Our invention can operate on any computing device or configuration of computing devices including one single computing machine as a stand-alone or in a client/server configuration within an enterprise environment or across the global internet.

Figure 3:
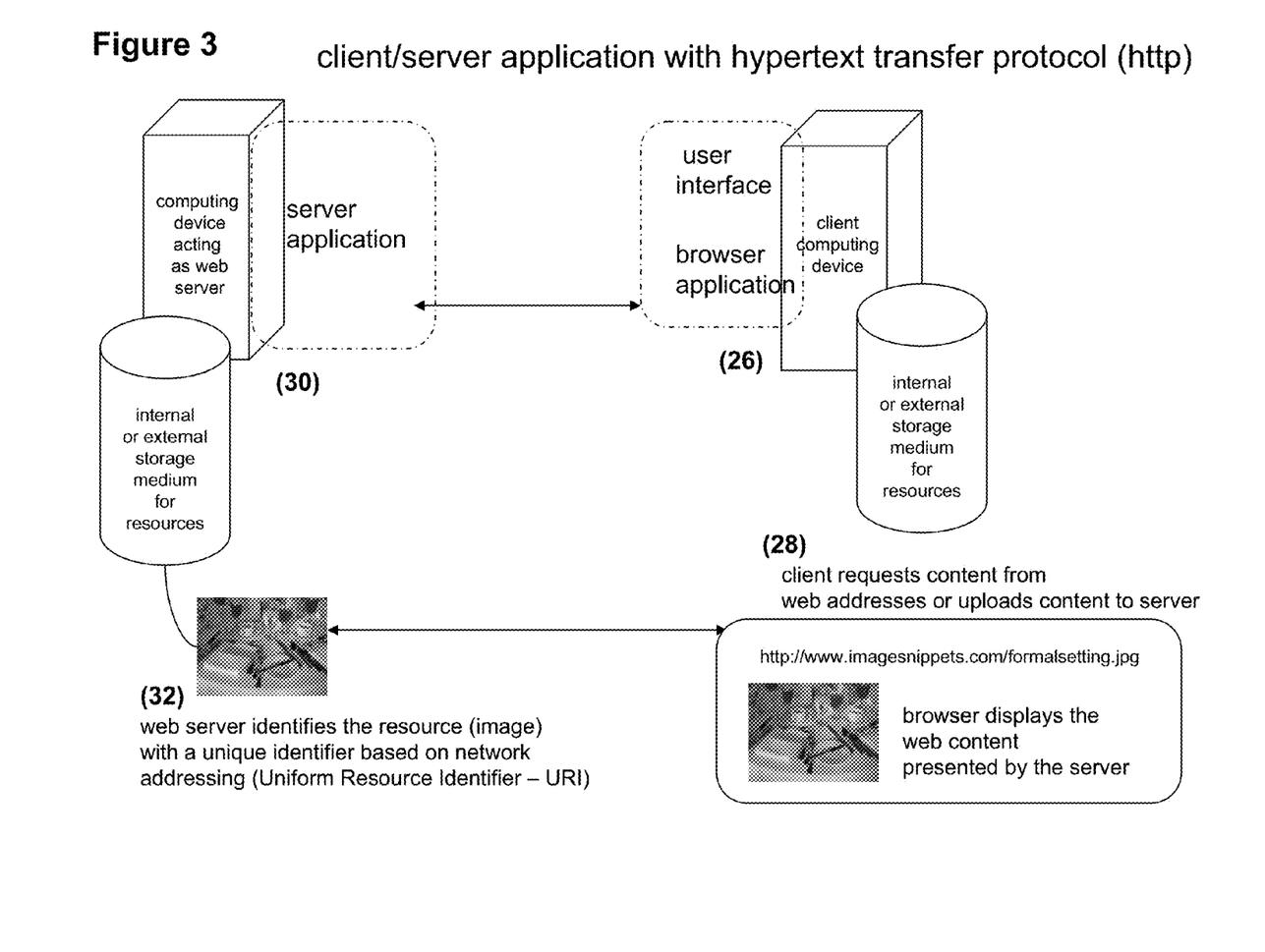
FIG. 3 is a block diagram showing a basic client/server configuration exchanging information about resources through the http protocol.

FIG. 3 shows a basic client/server configuration. Client and server software can operate on the same computing device, but a more typical information system involves a client device interacting with a non-colocated server. The client device software (user interface/web browser) (26) communicates a request for an information system resource (28) from the software running on a web server (30) which identifies the information system resource with a Uniform Resource Identifier (URI) based on the server's network address (32).

Figure 4:
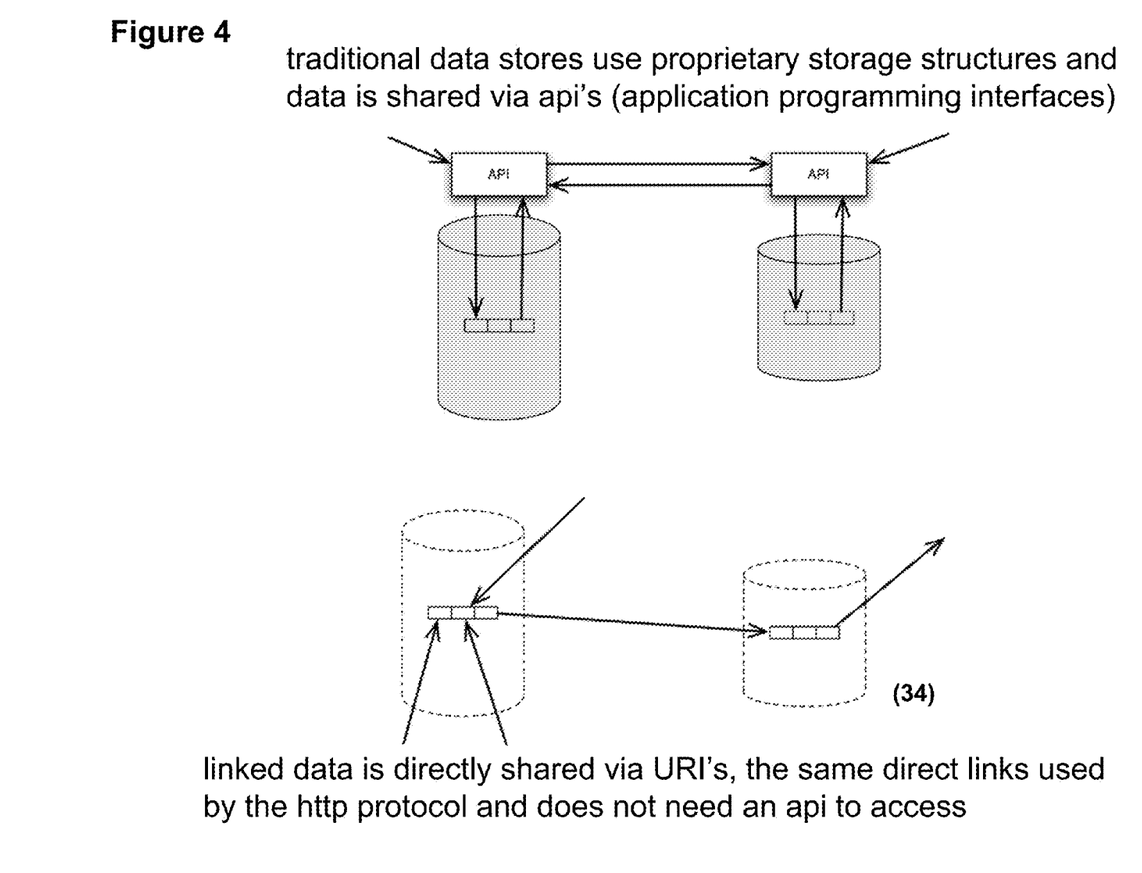
FIG. 4 illustrates the linked data architecture compared to data silos.

Computing systems use various methods for storing data in ways that can be queried and retrieved logically. Relational databases are one such storage system. When data is stored in this method, the storage format is known as a silo. To store or query this data, a proprietary format is used and must be accessed with an application programming interface (API). All access is through the API. In contrast, linked data is a way of storing data as direct links between actual data items; and when done correctly, the silos are semantically irrelevant. The architecture is then open and transparent. Linked data requires global conventions for linking (global identifiers) and for descriptions. FIG. 4 illustrates the linked data architecture free of silos (34) using global identifiers. Web server software can serve the URIs/HTTP and RDF (Resource Description Framework). The preferred embodiment of our invention described here uses the RDF variant known as RDFa which adds attribute-level extensions to HTML, XHTML and various XML-based document types.

Figure 5:
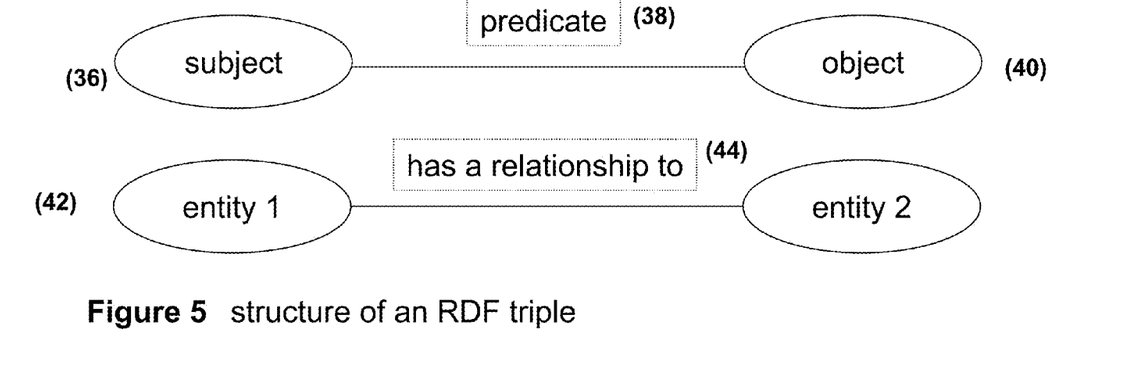
FIG. 5 shows the structure of an RDF (Resource Descriptive Framework) triple.
Figure 6:
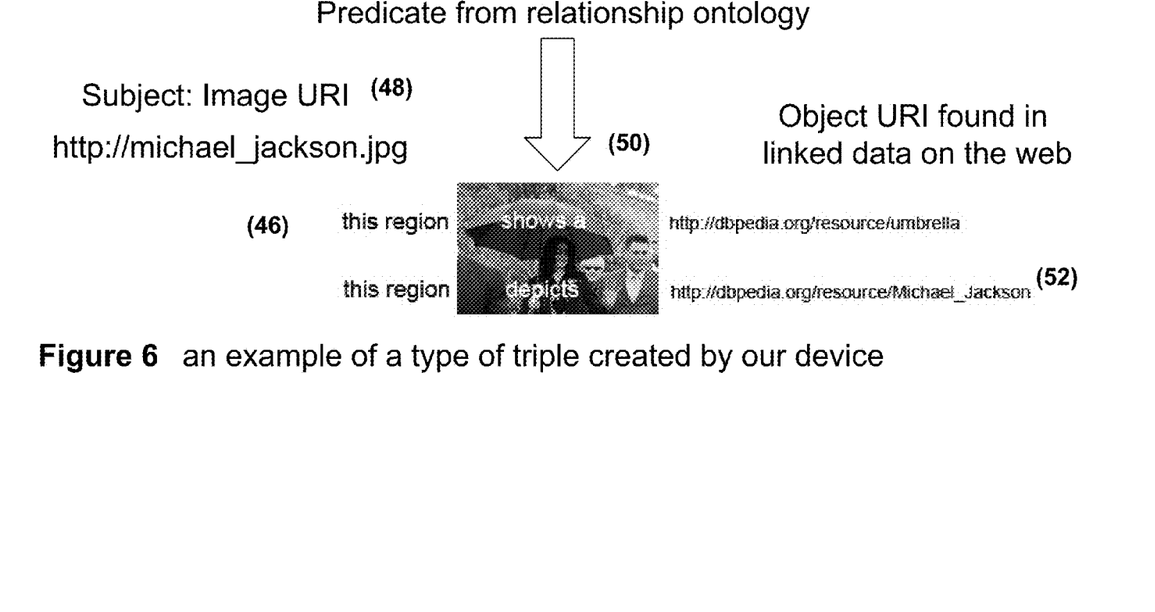
FIG. 6 is an illustration of a triple describing an image created by our device.

Resource Description Framework is a general model for making statements about resources, particularly information system resources. The structure of RDF statements is illustrated by FIG. 5. The block diagram shows that data can be represented in a statement consisting of three parts: a subject value (36), a predicate (38) and an object value (40). These can also be referred to as entities (42) that share a relationship (44). Human agents (users) can read and understand the simple construction of an RDF triple just as they would understand normal sentence construction. A simple sentence constructed from (46) in FIG. 6 would read like this: this image—depicts—Michael Jackson, where the words 'Michael Jackson' would ordinarily be known as a keyword in existing systems. The usefulness of storing information as a triple comes from the ability for a computing device to store, manipulate and make calculations with this same data. A computing device needs to understand more things about the data in order to make computationally useful expressions, for example: it needs to know what 'Michael Jackson' is. A machine does not know that 'Michael Jackson' is a person unless a prior piece of data has established this fact. All entities must therefore have type definitions. Further, the syntax of the triple must be written in a format commonly shared across all of the devices that will query and use the data. RDF and the linked data architecture use Uniform Resource Identifiers (URI's) to represent each part of an entity1—relationship—entity2 triple. In our device, we refer to the resource we are annotating as the subject of the triple itself The subject value (48) then becomes the http address given by a web server application to an image. A relationship value (50) must be used to complete the RDF triple and is also necessary for a user to express the context of the object value (52) to the subject. Each piece of an RDF triple must be defined with a machine accessible URI. In linked data, an ontology stores type, class, and instance data and predicate relationships to the entities they describe. In our present example, we use an ontology created for the purpose of linking keywords to images or parts of images, but the relationship entity can be derived from any ontology that currently exists or has yet to be created. In our present example, we have purposely created a small set of terms to express relationships between our subject entity (the image or a part in the image) and our object value, the keyword or phrase.

Figure 7:
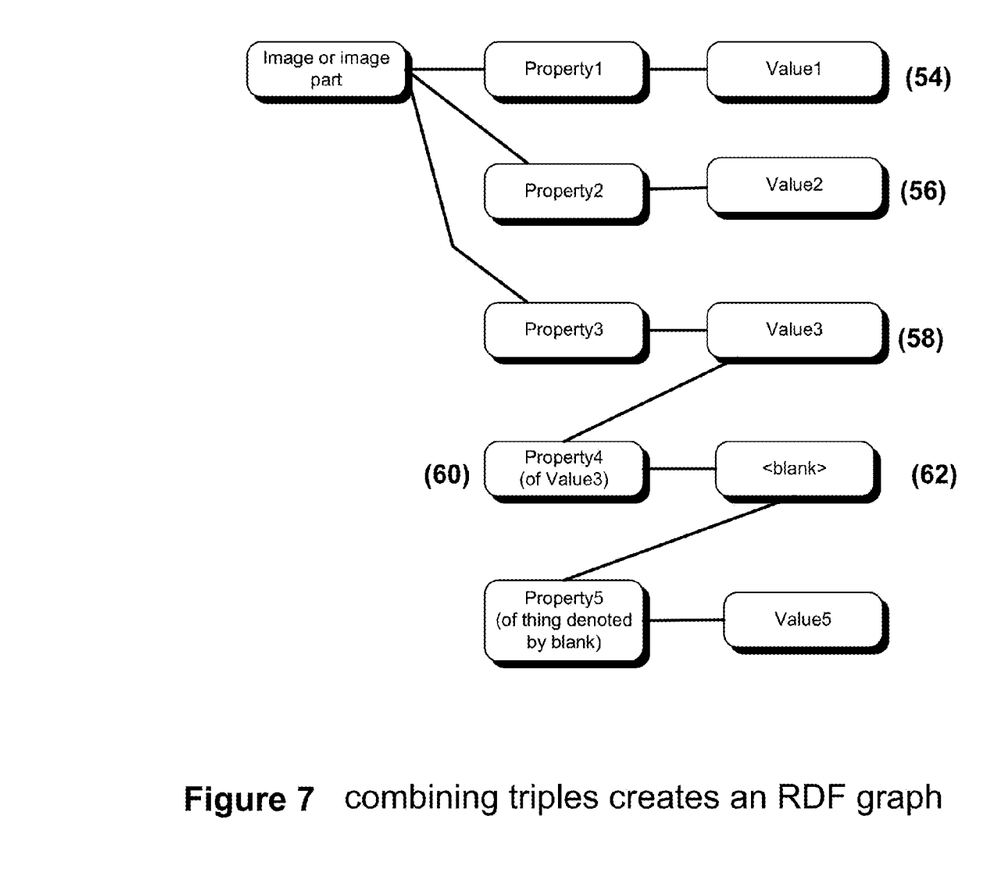
FIG. 7 is a block diagram of triples which can be chained together and form a named graph.

A collection of RDF triples is referred to as an RDF graph. FIG. 7 illustrates multiple RDF expressions used in our device represented as a graph. Triples (54), (56) and (58) show three separate expressions about the same image. Using the example in FIG. 6, a user might create the following statements to describe the image: This image depicts Michael Jackson, this region depicts an umbrella and this region depicts a child. Each of the relationship property, object values pairs all complete a triple with the same subject value. But human language lets us make much more complex descriptions, and with our device, we have invented a method for building more complex expressions that are saved as RDF graphs.

In FIG. 7, we illustrate a model for chaining triples together. The sentence this image depicts Lassie which is at Disneyworld becomes two triples, where the object of the first triple becomes the subject of the second triple (60) and in RDF is represented as two triples. This image depicts Lassie and Lassie is at Disneyworld, where the phrase 'is at' becomes the relationship predicate for the second triple. Both triples are still associated with the same image through the use of the graph. The word 'which' serves as a linking word in our interface, but could alternately be any number of words that would serve the function of providing linking mechanism between phrases.

Further, RDF also allows us to express relationships about things for which a URI is not given. Subject or object terms can become blank nodes when the subject/object refers to a 'placeholder' rather than an entity (62). When an object entity in our device refers to a class of entities, rather than as an entity itself, the object becomes a blank node in our graph. If a user wanted to express the following concept: This image depicts a dog at Disneyworld. The image (subject1) would have a URI and Disneyworld (object5) would have a URI, as shown by (62), but 'a dog' would only represent a placeholder for a 'thing' about which nothing else was known other than that it was a member of the class of dogs. In this case, the object value of a dog would then be represented as a blank node in our graph about this image. With our device, it is not necessary for the users to have an understanding of how to write these kinds of complex expressions in RDF, a language written for machines. Instead, we present a user experience that guides them in constructing chained triples which more closely resemble their desired expression semantically, while enabling the device to construct syntactically correct RDF. In our interface, the phrase: 'This image depicts a dog which has Setting Disneyworld' communicates relatively the same information for the user, but can also be saved as two RDF compliant triples without the user having to learn how to construct a blank node.

Figure 8:
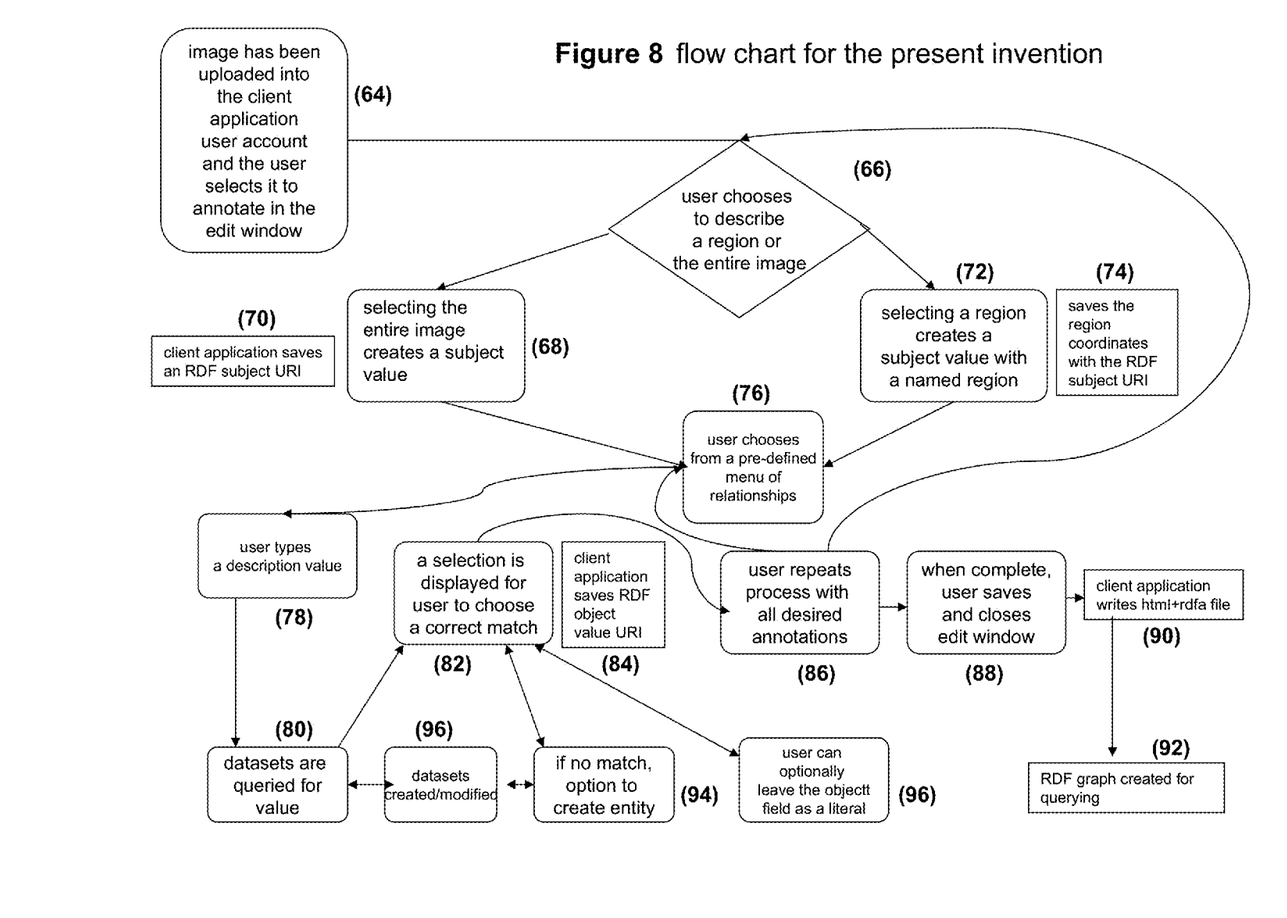
FIG. 8 is a flow chart for the present invention.

FIG. 8 is the flow chart for the present invention. In our description of the elements used, we refer to 'selections', 'regions' and 'windows' which are all commonly recognized as graphical user interface conventions widely used by those practiced in the art. We would like to emphasize that while we refer to these conventions for the sake of describing an 'action' or a screen object in the interface design, all of these conventions could be exchanged with similar conventions that would accomplish the same goals. For example, the act of selecting might be accomplished by dragging, clicking, looking at a region with an eye tracking device, giving a spoken command or any other type of interface function that allows a user to make a choice. The preferred embodiment of the device presents to the user an account where they can upload and store the resources (in our case, images) they would like to describe. Graphically, in the user interface, the images can be presented in multiple ways to the user but in our preferred embodiment display, we show the uploaded images, and the buttons for uploading and multi-selecting images for batch editing inside of a tabbed window. The graphic interface could easily be changed to show one image at time in a small mobile device for example or our device could be used as a module or plug-in to any number of pre-existing graphic interfaces that allow users to access and manipulate data about a resource. Regardless of the interface convention used, the user establishes a connection with the image they would like to describe (64). Typically, they will be presented with the image at this point and will have conceived of several things they would like to say about the image. In the next step (66), they will be able to choose whether they would like to refer to the entire image (68) or to a part or region in the image (72). It should be noted here that a part in any resource can be expressed differently. Audio or video clips have segments, documents have words, sentences paragraphs, etc., musical scores have sections, etc.

All can be examples of parts of digital resources. Here we refer to the use of a conventional system for recording the x/y coordinates of an area that has been defined by a user clicking and dragging a mouse or other computer pointing device to draw the region around an area of the image presented to them on a display device. Once the user has determined their subject, the device prompts the user with a new input area and a menu of choices (76). At this time, the invention has recorded the users choice of subject as the subject of an RDF statement, either as the entire resource, and its URI (70), or as the conventionally defined part of the resource (74). In the next step (76), the user is given a choice of words or phrases that logically represents a relationship between the subject the user has just defined and an object value description they will select in the next step. In our current example, we use a selected group of relationships we have identified that exist between images and a range of word or phrases that can be used to describe the images or parts of images. The source of these relationships is an ontology. Other custom defined ontologies in whole or in part can be used to provide the source for this choice in the process. The predicate or relationship entity is encoded and stored in the computing device or on a networked device as a URI so that once the user has selected a term, the device will store this information as the predicate for the RDF triple. In this embodiment of the invention, the device then immediately presents the user with a text box for the entry of a descriptive word (78) that goes with the image or the region being described. At this point, the device, transfers this word or phrase (80) through the use of a computing function to an algorithm used to query sets of data that contain stored definitions of entities along with their URI's. In our device, one or multiple sets of linked data (data containing machine readable RDF) can be queried. Our device allows users to select the datasets they would like to query including datasets they create themselves. The datasets can be locally cached and pre-loaded into the computing device or they can be queried dynamically across a linked data network. After the query has been performed, the user can then make several choices.

First, they can choose to scan through the returned entities that have been returned as matches for their object value (82). In our current example, these choices are available to the user with an icon that signals that matches have or have not been found in the queried datasets. Selecting this icon opens up a window that presents the returned entities in a humanly readable dictionary style format. It is important to note that the returned results can be shown to the user in a variety of graphical presentations: expanding circles, unfolding boxes, tabbed auto-complete functions or any other display option that presents to the user a list of appropriately matching words or phrases and their meaning from stored datasets containing entities defined with URI's. The use of the look up function allows the user to select the most correct and precise meaning for their descriptive word. If the user has typed, for example, osprey, the user can select whether they are referring to the bird or the aircraft. This action is referred to as disambiguation and is a key concept in the usefulness of identifying data on the web and storing it as open, machine readable RDF.

At this point if the user has found a suitable match from the look-up of their object term, the user makes this selection and the interface saves the URI of the object value (84).

When a user has typed in an object value and a look-up has been performed, they are not limited in selecting one of the returned entities. They can choose at this junction to ignore the look-up and leave the term as they typed it (96). This option will save the object value typed by the user as an RDF literal. An RDF literal is a provision in the RDF syntax which allows the object value to be stored as raw text. It is useful, in some circumstances to choose not to store an entity as a URI. Items such as phone numbers or an address are good examples of data usually stored as literals. The use of storing the object values as URI's is preferable so that both humans and machines can maximize the computational benefits provided by URI based entities, however it is also important that the provision for saving literals is included as part of our design.

Since having an RDF object value saved with a URI is preferable and there are occasions when multiple datasets searched do not contain the exact expression you desire, a third option exists for the user. In our preferred embodiment, the look-up function (82) returns an icon that signals either that a possible match has been found or that a match has not been located. At this point the user also has an option to either ignore the returned options if they do not find a suitable match and create a new entity or the icon signaling that a match has not been found allows the user to create a new entity (94). In our preferred embodiment, a 'create entity' window is displayed and the user can fill in the appropriate information about the entity they are describing. For example, if a user had entered a local location: Joe's Famous Fish House for which there was no match found and they felt they were going to use this object value again in the future or with some regularity, they would enter it into a user-defined dataset through an interface that would prompt the user for the appropriate information needed to create the entity and the interface would then establish a URI for this entity. The user-defined datasets are kept up-to-date as included in the querying algorithm and are available for the next look-up (96).

Once a user has entered and completed their object value entry using their chosen entity, or a literal, an RDF triple has then been successfully created (84). The user can then choose whether they wish to say more about the object they have just entered. A conventional icon element is used in our current device to allow the user to chain another triple to their first triple. With a combination of symbols, the user can either form a triple about the previous object, which then becomes the subject of the following object or they can make additional statements about the first subject. In this way, complex triples can be chained together: this image depicts a Porsche 356 [which] has Setting New Orleans [and which] has Color Red [and which] is OwnedBy a man [which] has Nationality American [and which] has Name "Tom". In our device the symbols would be the corresponding words and icons used to accomplish the same goal as the 'which' and the 'and which' given in this example. This example would create series of six RDF triples all logically and correctly constructed for both the user to read and for a machine to interpret, the last triple: a man has Name "Tom" would be an RDF triple.

Figure 9:
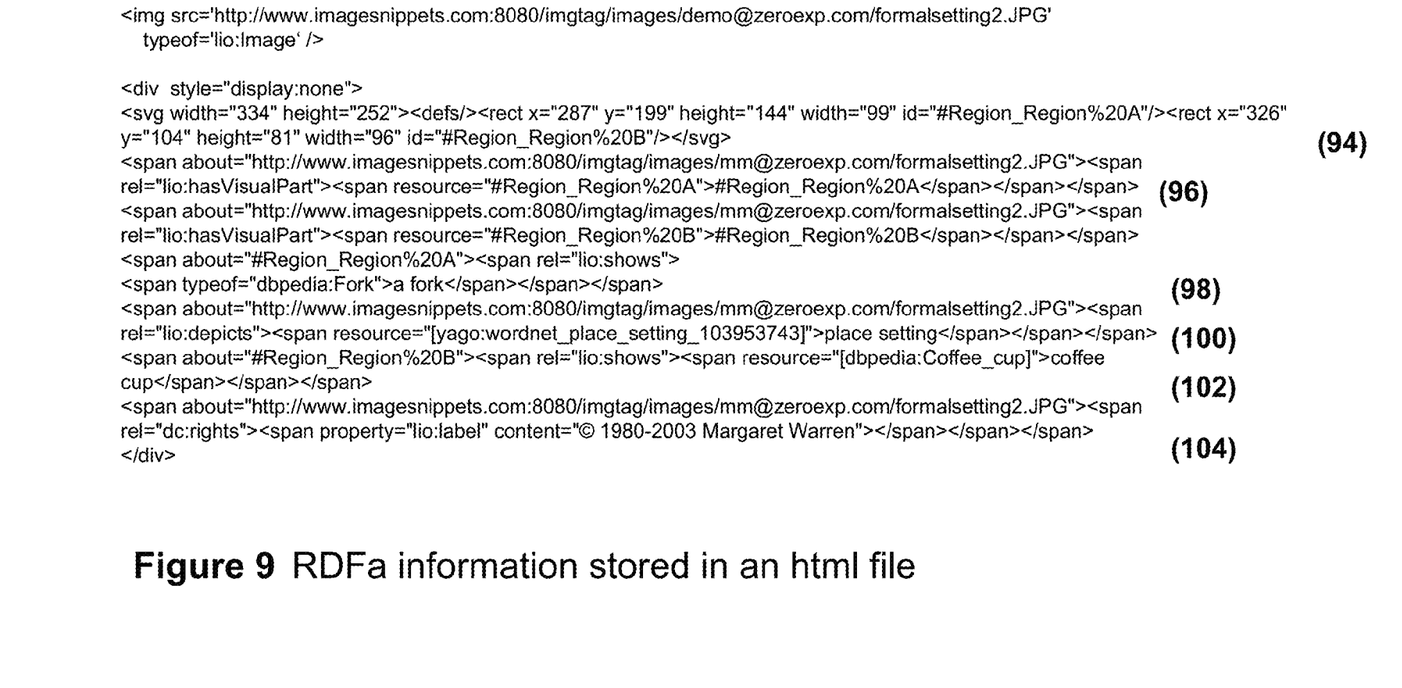
FIG. 9 is an example of the RDF, a code output from our device.

The user may create as many combinations of triple constructed annotations as they desire. By returning to (66) the user can select the image again (as a subject) or a new region or can return to (76) to chain a new triple to an existing triple using a new relationship property. When the user has completed as many triples as they would like about a given image, they can save and end the session (88). As with any conventional computing device, the end of the session can be marked by a variety of buttons, symbols and notifications for the user. At the end of the session our present invention saves all of the correct, industry compliant RDFa triples within an HTML file (90) and also creates an RDF graph (92) which is saved on the server and available for querying. Once the machine computable data has been created by the human agent, the user, it is also available for transport and re-use throughout a larger information system or the global distributed network of linked data. FIG. 9 is an example of the RDFa output by our device for triples created about the image (10) in FIG. 1. The region information (94) is a common representation of region data using conventions already widely used and (96) is definition of that region as a part of the image using our system. The RDFa triples shown by (98), (100), and (102) represent the following statements made by user inside our system: Region A shows a fork, this image depicts a place setting, and Region B shows a coffee cup, respectively. The object values in (98) (100) and (102) used in this example are represented as entities with URI's located in the DBpedia dataset. DBpedia is a publically available dataset containing structured content from Wikipedia. Our device can locate entities from any number of possible datasets that have been configured as sources for the user to query, and the resulting RDFa code would be identical in structure with the only difference being different URI's. In a preferred embodiment, the device also stores and converts to RDF other data that is commonly stored about an object from other fields imported or filled in by the user such as copyright (104). After the RDF data has been created, that data is locally re-usable immediately, available for querying and further editing and the link to the file containing the data created by our device is embedded into the file by conventional means of storing metadata in resources. Additionally, the data is also available for transport to other resource and data stores by means of widely used methods for sharing and embedding data elsewhere in an information system.

One aspect in which the utility of the present invention is not immediately obvious is that the structure of the metadata file helps to protect images from becoming "orphan" works, which occurs when the provenance and other metadata about the image can discarded from the image. The metadata file created by the system is physically and logically distinct from the image file (or digital resource). The metadata files produced by our system using HTML with RDFa, contain link(s) to the image file(s) (or digital resources) and can display the image or resource conventionally in a web browser, but can be stored separately from the image or resource file itself. Image files may contain embedded metadata which is derived from various open standards including, but not limited to: XMP, IPTC, EXIF, etc. This metadata is conventionally used to store ownership, origin and copyright information as well as other attributes. Our system leaves this embedded metadata intact, and also encodes this same information into the HTML+RDFa file in the structured data triple form. The HTML+RDFa file can then be embedded or shared across the web allowing dynamic updates to the metadata and has the important effect of protecting the data from being 'stripped' by social applications and environments such as Flickr, Facebook, Twitter or any other image/resource sharing social computing system. These programs can remove embedded metadata from image files, rendering them liable to be classified as "orphan" works and, therefore, not subject to copyright protection. Since the metadata file created by the invention is stored on digital hardware which can be physically separated from the image file itself, it cannot be stripped from the image file, and remains a secure record of copyright and ownership information associated with the image (or digital resource) linked to a social application or web environment.

Another aspect of the invention is to use the structured, linked metadata to connect image content creators to image consumers such that the images might be altered through both the metadata and the the image (or resource) itself by consumers for the purpose of sponsorship and advertising, including through a social network medium, where both the image and it's metadata are managed outside of the social network itself Additionally, any system driven by this invention would be able to function as a service in both the integration and segregation of images or their URI's (Uniform Resource Indicator) and their image metadata regardless of where the image(s) (or resources) are located, while still maintaining a connection between the respective components.

In general, the method of building computable annotations storing structured metadata linked to images in a separate file allows images to be managed independently of their descriptive metadata and conversely, the descriptive metadata can be maintained, modified and queried without the image (or resource) persisting with the metadata.

Screen-shot representations of a prototype website for creating metadata for images can be seen in U.S. Provisional patent application Ser. No. 61/833,209, filed Jun. 10, 2013, which is incorporated herein by reference.

PARTS LIST

The following is a list of parts and materials suitable for use in the present invention:
Parts Number Description
10 image used in example of the present invention
12 metadata in the form of keywords
14 central processing unit
16 input devices
18 local storage devices
20 closed network (such as an "intranet")
22 open network (such as "the internet" or "world wide web")
24 computing devices (such as mobile devices, smart phones, tablets, laptops, wireless printers, and cameras)
26 client/user interface
28 request for information system resource
30 web server
32 Uniform Resource Identifier (URI)
34 linked data architecture
36 subject value
38 predicate
40 object value
42 entity
44 shared relationship
46 data
48 subject value
50 relationship value
52 object value
54 triple
56 triple
58 triple
60 second triple
62 place holder
64 image to be described
66 user's choice
68 selection of entire image
70 entire resource and its URI
72 selection of part of image
74 conventionally defined part of resource
76 menu
78 descriptive word 80 query of datasets
82 look-up function
84 RDF triple
86 repeat option
88 save and close
90 HTML file
92 RDF graph
94 new entity
96 original term
98 object value
100 object value
102 object value
104 other commonly stored data (such as copyright)

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A system comprising:
a computing device comprising a central processing unit;
the central processing unit implementing a client application layer consisting of a digital resource presentation and an ontological markup presentation including one or more client applications; an interface layer including digital resource interface, annotation store interface, and ontology store interface; a storage layer including an annotation store, and an ontology store;
wherein the interface layer operates to allow the one or more client applications to retrieve from the storage layer a digital resource, an annotation from the annotation store, and ontology from the ontology store,
and wherein the client application layer operates to create a visual resource from the digital resource in the digital resource presentation and an active annotation from the annotation and ontology in the ontological markup presentation,
and wherein the client application layer operates so as to view the annotation and ontology with the ontological markup presentation, and wherein the client application layer operates so as to create with the ontological markup presentation new annotation properties of the visual resource, and wherein the client application layer operates to store with the interface layer into the storage layer the newly created annotations,
and wherein the newly created annotations describe the content and intent of the digital resource,
and wherein the client application layer uses only menu selections and words typed by the client as sufficient input to create the resource annotation
and wherein the interface layer further operates to allow the one or more client applications to create new annotations for storage in the annotation store and remove annotations from the annotation store,
or wherein the client application layer continuously shows the digital resource presentation and the ontological markup presentation,
or wherein the newly created annotations describe the visual resource, and how the annotation relates to the visual resource;
and wherein the annotation is formed to conform to a distributed resource description framework format intended to allow a computing device to store, manipulate, and make calculations with this same data.

2. A system as recited in claim 1, wherein the client application layer continuously shows the digital resource presentation and the ontological markup presentation.

3. A system as recited in claim 1, wherein the newly created annotations describe what the visual resource depicts.

4. A system as recited in claim 1, wherein the storage layer further comprises a digital resource store that stores the digital resources.

5. A system as recited in claim 1, where the annotation comprises a chain of atomic links of any length terminating with a publicly accessible Universal Resource Identifier and the intermediate nodes in the chain each linked to a type name in the form of a Universal Resource Identifier, said chain generated by a sequence of interactions with the user based upon menu selections or words input by the user.

6. A system as recited in claim 1, where one or more of the Universal Resource Identifiers in the annotation are generated by the system based upon words input by the user.

7. The system of claim 1 wherein the storage layer cannot be stripped from the digital resource so as to protect the digital resource from becoming an orphan work.

8. A system comprising a computing device with a central processing unit, the central processing unit implementing:
a) a client application layer;
b) an interface layer;
c) one or more digital resources; and,
d) a storage layer, the storage layer comprising an annotation store;
wherein the client application layer allows for a user to create an annotation that conforms to a formalized resource description framework format using only menu selections and words typed by the user to create the annotation; and,
wherein the interface layer manipulates the formalized resource description framework formats created by the client application layer to describe the content and intent of the digital resource in a format that conforms to a distributed resource description framework format intended to allow a computing device to store, manipulate, and make calculations with this same data; and wherein the annotation store stores the annotations;
and wherein the annotation store is implemented on two different computing devices, and wherein the digital resource is a music file, or a document, or a video.

9. The system of claim 8, wherein the digital resource is a document.

10. The system of claim 8, wherein the digital resource is a video.

11. The system of claim 8 wherein the digital resource is a music file.

* * * * *